(12) United States Patent
Noh et al.

(10) Patent No.: US 10,070,381 B2
(45) Date of Patent: Sep. 4, 2018

(54) METHOD FOR ENERGY-AWARE SELECTIVE COMPRESSION SCHEME FOR SOLAR-POWERED WIRELESS SENSOR NETWORKS, NON-TRANSITORY COMPUTER-READABLE RECORDING MEDIUM FOR PERFORMING THE SAME AND DEVICE FOR THE SAME

(71) Applicant: Foundation of Soongsil University-Industry Cooperation, Seoul (KR)

(72) Inventors: Dong Kun Noh, Seoul (KR); Minjae Kang, Seoul (KR); Semi Jeong, Goyang-si (KR)

(73) Assignee: Foundation of Soongsil University-Industry Corporation, Seoul (KR)

( * ) Notice: Subject to any disclaimer, the term of this patent is extended or adjusted under 35 U.S.C. 154(b) by 198 days.

(21) Appl. No.: 15/189,567

(22) Filed: Jun. 22, 2016

(65) Prior Publication Data

US 2017/0171807 A1 Jun. 15, 2017

(30) Foreign Application Priority Data

Dec. 14, 2015 (KR) .......................... 10-2015-0177827

(51) Int. Cl.
*H04W 52/02* (2009.01)
*H04L 12/26* (2006.01)
*H04W 4/70* (2018.01)

(52) U.S. Cl.
CPC ......... *H04W 52/0203* (2013.01); *H04L 43/16* (2013.01); *H04W 4/70* (2018.02); *Y02D 70/00* (2018.01)

(58) Field of Classification Search
CPC .... H04W 52/0203; H04W 4/70; H04W 43/16
See application file for complete search history.

(56) References Cited

U.S. PATENT DOCUMENTS

| | | | | |
|---|---|---|---|---|
| 2007/0239862 | A1* | 10/2007 | Bronez | H04L 12/24 709/223 |
| 2016/0345260 | A1* | 11/2016 | Johnson | H04W 52/0209 |
| 2016/0359376 | A1* | 12/2016 | Zeine | H02J 50/80 |

FOREIGN PATENT DOCUMENTS

| | | |
|---|---|---|
| KR | 10-0914654 B1 | 8/2009 |
| KR | 10-2010-0064462 A | 6/2010 |

(Continued)

OTHER PUBLICATIONS

Min Jae Kang et al. "Energy-aware Selective Compression Scheme for Solar-powered Wireless Sensor Networks" 2015 Research in Applied Computation Symposium (RACS 2015); Oct. 9-12, 2015; Czech Technical University in Prague; Prague, Czech Republic.

(Continued)

*Primary Examiner* — Robert M Morlan
*Assistant Examiner* — Pamit Kaur
(74) *Attorney, Agent, or Firm* — Novick, Kim & Lee, PLLC; Sang Ho Lee (57) ABSTRACT

A method for an energy-aware selective compression scheme (EASCS) for solar-powered wireless sensor networks is provided. The method includes calculating an amount of residual energy of a battery in each of sensor nodes in a wireless sensor network, selecting one operation mode between a compression mode and a latency mode in reply to the amount of the residual energy, wherein the compression mode is a mode that data is compressed and transmitted, and the latency mode is a mode that the data is transmitted without compression, and compressing and transmitting the data if the compression mode in the each of (Continued)

the sensor nodes is selected, or transmitting the data without compression if the latency mode in the each of the sensor nodes is selected.

Accordingly, end-to-end latencies of sensor networks can be reduced while blackout times thereof do not increase by implementing energy optimization in the wireless sensor network.

13 Claims, 9 Drawing Sheets

(56) References Cited

FOREIGN PATENT DOCUMENTS

| KR | 10-1083153 B1 | 11/2011 |
|---|---|---|
| KR | 10-2013-0095874 A | 8/2013 |
| KR | 10-1467537 B1 | 12/2014 |

OTHER PUBLICATIONS

Min Jae Kang et al. "Energy-aware Selective Compression Scheme for Solar-powered Wireless Sensor Networks" Korea Computer Congress 2015 (KCC 2015); Jun. 24-26; Jeju National University Ara Campus, South Korea.

\* cited by examiner

Algorithm 1 EASCS-Init(*i*)

1: if $E_{residual}(i) > E_{threshold}(i)$ then
2:    $m_i \leftarrow 1$;
3:    invoke $S-LZW$ algorithm;
4: else
5:    $m_i \leftarrow 0$;
6:    retract compression algorithm;
7: end if

Algorithm 2 EASCS(*i*)

1: while 1 do
2:    if $E_{residual}(i) > E_{threshold}(i) + \psi$ and $m_i = 0$ then
3:      $m_i \leftarrow 1$;
4:      invoke $S-LZW$ algorithm;
5:    else
6:      if $E_{residual}(i) < E_{threshold}(i) + \psi$ and $m_i = 1$ then
7:         $m_i \leftarrow 0$;
8:         retract compression algorithm;
9:      end if
10:   end if
11: end while
12: sleep(*period*);

FIG. 4

| Symbol | Meaning |
|---|---|
| $E_{residual}(i)$ | Amount of residual energy of node $n_i$ |
| S-LZW | S-LZW compression algorithm |
| period | Periodic invocation cycle of the EASCS(i) |
| $E_{threshold}(i)$ | Energy threshold for changing mode, $(P_{sys}(i)/P_{sensor}(i)) \cdot C$ |
| $m_i$ | 1 if sensor node $n_i$ is in LatencyMode, otherwise 0 |
| $\psi$ | Energy window to prevent frequent change of the mode |

| Parameter | Description |
|---|---|
| Number of nodes | 20, 30, 40, 50, 60 |
| Node topology | Random |
| Size of topology | 10 x 10(m) |
| Experiment days | 30days |
| Duty cycle | 0.1 |
| TX range | 3.5m |
| TX energy | 0.021mW/1byte |
| RX energy | 0.015mW/1byte |
| Compression energy | 0.332mW/201bytes(S-LZW) |
| Routing | Energy-adaptive location based routing |

METHOD FOR ENERGY-AWARE SELECTIVE COMPRESSION SCHEME FOR SOLAR-POWERED WIRELESS SENSOR NETWORKS, NON-TRANSITORY COMPUTER-READABLE RECORDING MEDIUM FOR PERFORMING THE SAME AND DEVICE FOR THE SAME

CROSS-REFERENCE TO RELATED APPLICATION

This application claims priority to and the benefit of Korean Patent Application No. 10-2015-0177827, filed on Dec. 14, 2015, the disclosure of which is incorporated herein by reference in its entirety.

BACKGROUND

The present disclosure relates to a method for an energy-aware selective compression scheme for solar-powered wireless sensor networks, a recording medium for performing the same and device for the same, and more particularly, to an energy-aware selective compression scheme in which end-to-end latency is reduced by using extra energy.

A sensor network is being used in several specific applications such as military, healthcare, disaster monitoring, ecosystem monitoring, a smart home, and the like. Such a sensor network includes lightweight nodes having constrained hardware resources.

Specifically, many studies for overcoming short life-cycle of a network due to limited amount of energy of a battery are underway. In some studies among such studies, the problem of short life-cycle of the network is fundamentally addressed by using solar panels and rechargeable battery resources instead of limited battery resources. Specifically, because of periodicity, predictability, high energy density, and the like among energy resources of an energy-harvesting node, solar energy-harvesting sensor networks are being widely used.

Meanwhile, large amount of energy consumption of a sensor network is used for data transmission through radio frequency, and thus, data compression is used as one of the areas of study for resource optimization in the sensor network. The amount of energy used through the radio frequency may be reduced by reducing the data size through the data compression.

The compression has a trade-off between data size and time used for the compression (latency). The trade-off depends on characteristics of applications in the sensor network, but when latency is permitted to some extent, a lot of energy may be reduced through the compression.

Since a general sensor node is powered by a battery in terms of the sensor network, the general sensor node has limited hardware resources and thus, the life-cycle of the network is short. Since the short life-cycle of the network may cause a problem in the overall performance of the network, the problem needs to be addressed. Meanwhile, a solar energy-harvesting sensor node is able to periodically collect energy and predict the collection, has sufficient energy for driving the sensor node, and thus compensates for a limitation of the general sensor node.

However, extra energy generated by charging a lot of energy during daytime is not fully taken advantage of, and thus is not used and eventually is likely to be discarded. That is, an energy optimization problem occurs.

In terms of data compression, although the entire energy consumption of the sensor network is reduced due to a reduction of an amount of energy required for transmitting and receiving data in each sensor node by compressing the data, there is a problem in that processing overhead such as increase of a latency for the data compression, energy use, and the like is present.

SUMMARY OF THE DISCLOSURE

One embodiment of the present disclosure is directed to a method for an energy-aware selective compression scheme for solar-powered wireless sensor networks in which energy optimization is implemented.

Another embodiment of the present disclosure is directed to a recording medium for performing a method for the energy-aware selective compression scheme for solar-powered wireless sensor networks, in which a computer program is recorded.

The other embodiment of the present disclosure is directed to a device for performing the energy-aware selective compression scheme for solar-powered wireless sensor networks.

According to an aspect of the present disclosure, there is provided the method for the energy-aware selective compression scheme for solar-powered wireless sensor networks, the method including calculating an amount of residual energy of a battery in each sensor node in a wireless sensor network, selecting one operation mode of a compression mode in which data is compressed and transmitted and a latency mode in which data is transmitted without compression according to the amount of residual energy, and compressing and transmitting data or transmitting the data without compression according to the selected operation mode in each sensor node.

The selecting of the one operation mode of the compression mode in which data is compressed and transmitted and the latency mode in which data is transmitted without compression according to the amount of residual energy may include selecting the latency mode when the amount of residual energy is more than or equal to a predetermined energy threshold window and selecting the compression mode when the amount of residual energy is less than the predetermined energy threshold window.

The method may further include maintaining the operation mode when the amount of residual energy is in a transition window of a predetermined energy threshold window.

The method may further include calculating the predetermined energy threshold window in each sensor node according to a charging rate of the battery.

The predetermined energy threshold window in each sensor node may be calculated by the following equation, $$E_{Threshold}(i) = \frac{P_{syn}(i)}{P_{solar}(i)} \cdot C(i)$$

$P_{solar}(i)$ denotes the average rate of energy collection in an $i^{th}$ node $n_i$, $P_{sys}(i)$ denotes the average rate of energy consumption in the $i^{th}$ node $n_i$, and $C(i)$ denotes the full capacity of a battery in the $i^{th}$ node $n_i$.

The average rate of energy consumption in the $i^{th}$ node $n_i$ may be obtained by profiling an amount of energy consumption, $P_{sys}(i)$ while each sensor node operates, and the average rate of energy collection, $P_{solar}(i)$, may be obtained by profiling an amount of collected energy.

According to another aspect of the present disclosure, there is provided a non-transitory computer-readable recording medium for performing the method for the energy-aware selective compression scheme for solar-powered wireless sensor networks, in which a computer program is recorded.

According to another aspect of the present disclosure, there is provided a method for an energy-aware selective compression device for performing an energy-aware selective compression scheme for solar-powered wireless sensor networks, the device including an energy calculating unit which calculates an amount of residual energy of a battery in each sensor node in a wireless sensor network, a threshold calculating unit which calculates a predetermined energy threshold window in each sensor node according to a charging rate of the battery, a mode selecting unit which selects one operation mode of a compression mode in which data is compressed and transmitted and a latency mode in which data is transmitted without compression according to the amount of residual energy, and a transmitting unit which compresses and transmits the data or transmits the data without the compression according to the selected operation mode in each sensor node.

The mode selecting unit may select the latency mode when the amount of residual energy is more than or equal to the predetermined energy threshold window and may select the compression mode when the amount of residual energy is less than the predetermined energy threshold window.

The mode selecting unit may maintain the operation mode when the amount of residual energy is in a transition window of the predetermined energy threshold window.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Detailed descriptions of the disclosure will be made with reference to the accompanying drawings illustrating specific embodiments of the disclosure as examples. These embodiments will be described in detail such that the disclosure can be performed by those skilled in the art. It should be understood that various embodiments of the disclosure are different but are not necessarily mutually exclusive. For example, a specific shape, structure, and characteristic of an embodiment described herein may be implemented in another embodiment without departing from the scope and spirit of the disclosure. In addition, it should be understood that a position or an arrangement of each component in each disclosed embodiment may be changed without departing from the scope and spirit of the disclosure. Accordingly, there is no intent to limit the disclosure to detailed descriptions to be described below. The scope of the disclosure is defined by the appended claims and encompasses all equivalents that fall within the scope of the appended claims. Like numbers refer to the same or like functions throughout the description of the figures.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Hereinafter, exemplary embodiments of the disclosure will be described in detail with reference to the accompanying drawings.

Figure 1:
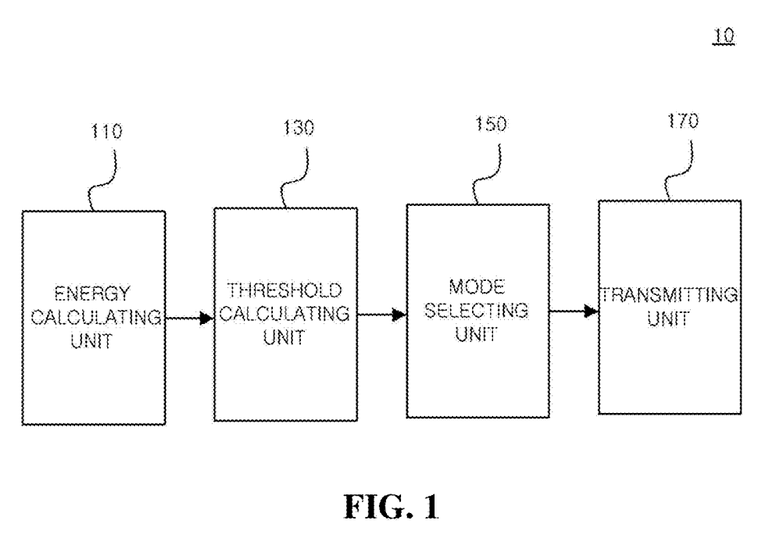
FIG. 1 is a block diagram of an energy-aware selective compression device according to one embodiment of the present disclosure.
Figure 2:
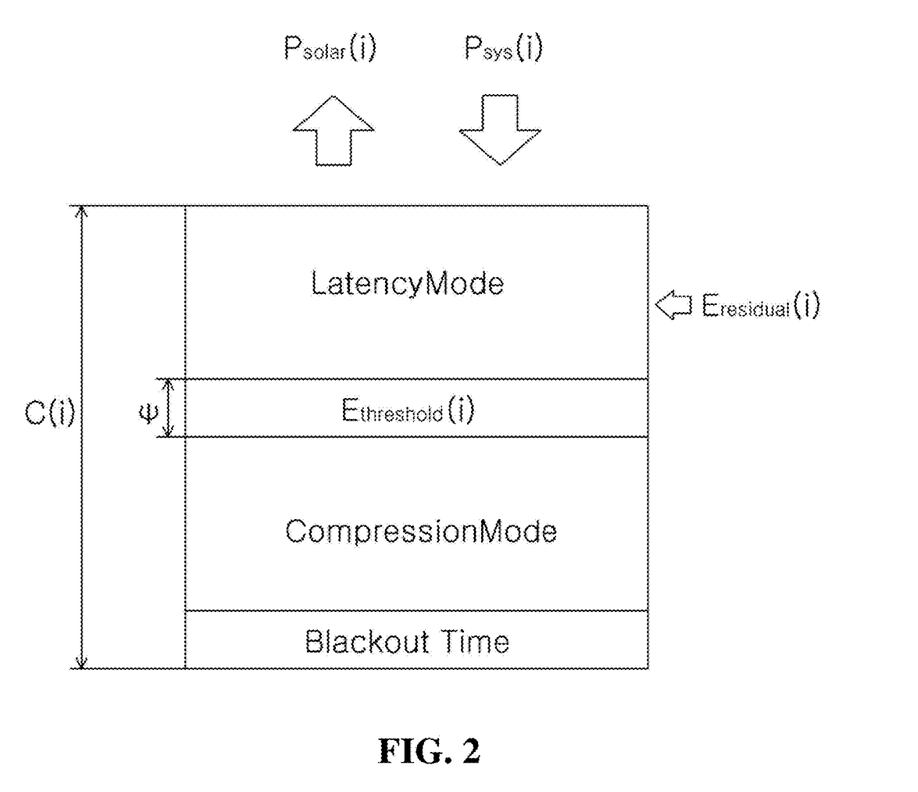
FIG. 2 is a conceptual view illustrating a relationship between an energy model and operation modes of a system described in the present disclosure.

FIG. 1 is a block diagram of an energy-aware selective compression device according to an embodiment of the present disclosure. FIG. 2 is a conceptual view illustrating a relationship between an energy model and operation modes of a system described in the present disclosure.

In sensor networks, compression has a trade-off between end-to-end latency and energy usage. When compression is performed to reduce data size, additional latency and energy consumption occur, and energy consumption for data transmission is reduced. Generally, in a battery-powered sensor network, compression is widely used to maximize lifetimes of the networks even when latency is lost. Meanwhile, in a solar-powered wireless sensor network, energy is periodically reproduced, and thus, sufficient energy or more for operating may be present.

In the energy-aware selective compression device 10 according to the present disclosure (hereinafter, referred to as a device), an energy-aware selective compression scheme (EASCS), in which end-to-end latency is reduced by using extra energy in the solar-powered wireless sensor networks, is described herein. In the described method, compression is used to reduce energy consumption when energy of a node is insufficient, and the compression is not used to reduce end-to-end latency when the energy of the node is sufficient.

Referring to FIG. 1, the device 10 according to one embodiment of the present disclosure includes an energy calculating unit 110, a threshold calculating unit 130, a mode selecting unit 150, and a transmitting unit 170.

Software (an application) for performing the energy-aware selective compression for solar-powered wireless sensor networks may be installed and executed in the device 10 according to one embodiment of the present disclosure, and components of the energy calculating unit 110, the threshold calculating unit 130, the mode selecting unit 150, and the transmitting unit 170 may be controlled by the software for performing the energy-aware selective compression for solar-powered wireless sensor networks executed in the device 10.

The device 10 may be a separate terminal or some modules of a terminal. Further, the components of the energy calculating unit 110, the threshold calculating unit 130, the mode selecting unit 150, and the transmitting unit 170 may be formed as an integrated module or as one or more modules. However, on the other hand, each component may be formed as a separate module.

The device 10 may be movable or fixed. The device 10 may be a socket type, a server type, or an engine type, and may be called as another term such as a terminal, a device, an apparatus, user equipment (UE), a mobile station (MS), a wireless device, a handheld device, and the like.

The device 10 may execute or may be manufactured by various types of software based on an operation system (OS), that is, a system. The OS, which is a system program for allowing software to use hardware of a device, may include both of a mobile computer OS such as Android OS, iOS, Windows Mobile OS, Bada OS, Symbian OS, BlackBerry OS, and the like, and a computer OS such as Windows-based OS, Linux-based OS, Unix-based OS, MAC OS, AIX OS, HP-UX OS, and the like.

The energy calculating unit 110 calculates an amount of residual energy of a battery in each sensor node, and the threshold calculating unit 130 calculates a predetermined energy threshold window in each sensor node according to a charging rate of the battery. The mode selecting unit 150 selects one operation mode of a compression mode in which data is compressed and transmitted and a latency mode in which data is transmitted without compression according to the amount of residual energy, and the transmitting unit 170 compresses and transmits the data or does not compress and transmit the data according to the operation mode selected in each sensor node.

Referring to FIG. 2, the mode selecting unit 150 may select the latency mode when the amount of residual energy is more than or equal to the predetermined energy threshold window, and may select the compression mode when the amount of residual energy is less than the predetermined energy threshold window. When the amount of residual energy is in an interval range of the predetermined energy threshold window, the operation mode, which was previous selected, may be maintained without being changed.

A node to which the EASCS is applied operates in the latency mode when the amount of residual energy is more than or equal to the predetermined energy threshold window, and operates in the compression mode when the amount of residual energy is less than the predetermined energy threshold window as illustrated in FIG. 2. In the latency mode, the data is transmitted without compression in order to reduce the end-to-end latency even when the energy consumption is large. On the other hand, in the compression mode, the data is compressed using an S-LZW (Lempel—Ziv—Welch) compression algorithm and then is transmitted. Therefore, the energy consumption is reduced, but the end-to-end latency is increased.

Accordingly, the above-described two modes dynamically operate according to the amount of extra energy, and thus efficient results may be obtained in both terms of the energy and the latency. Further, since the extra energy is used, a blackout time does not increase.

Detailed functions of each component will be described in detail in the following EASCS for solar-powered wireless sensor networks.

Figure 3:
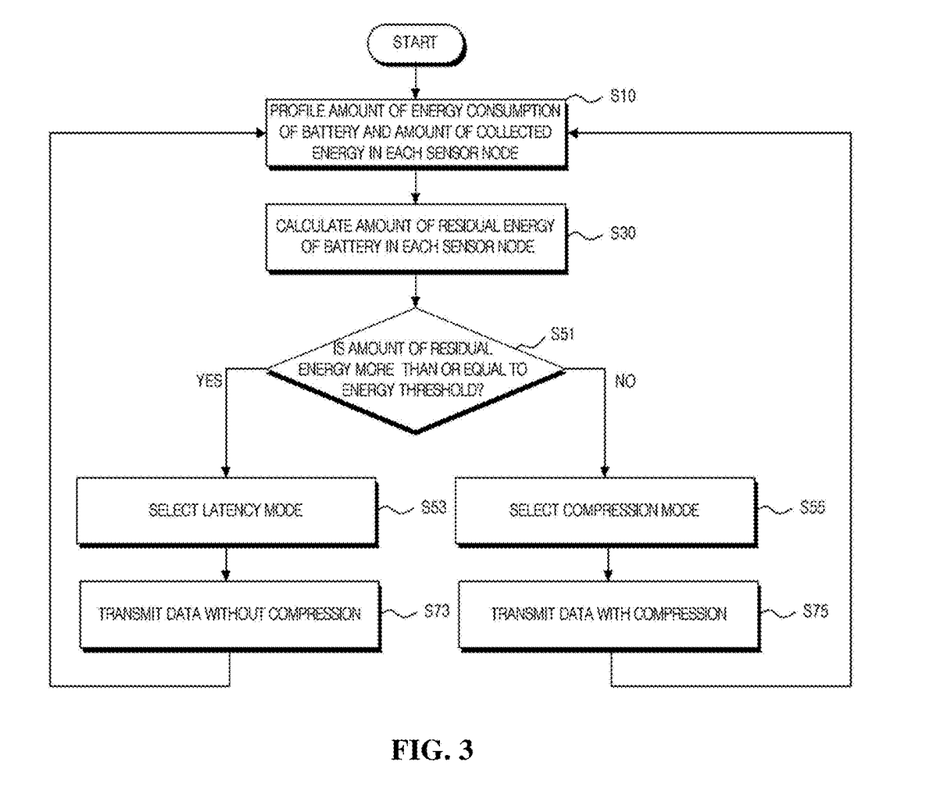
FIG. 3 is a flowchart of an energy-aware selective compression scheme according to one embodiment of the present disclosure.

FIG. 3 is a flowchart of an EASCS for solar-powered wireless sensor networks according to one embodiment of the present disclosure.

The EASCS for solar-powered wireless sensor networks according to one embodiment of the present disclosure may be performed with substantially the same configuration as that of the device 10 of FIG. 1. Therefore, the same reference numerals are assigned to the same components as those of the device 10 of FIG. 1, and repeated description will be omitted.

Further, the EASCS for solar-powered wireless sensor networks according to one embodiment of the present disclosure may be executed by software (an application) for performing energy-aware selective compression for solar-powered wireless sensor networks.

In the EASCS for solar-powered wireless sensor networks according to the present embodiment, a threshold of extra energy of a battery is calculated, data is transferred after performing compression in order to reduce an amount of energy consumption when an amount of residual energy of the battery is less than the threshold, and the data is transferred without compression in order to reduce a latency by determining that there is sufficient energy when the amount of residual energy of the battery is more than or equal to the threshold. In such a method, end-to-end latency in the sensor networks may be reduced while a blackout time in the sensor networks is not increased compared to a method in which compression is performed in all modes.

Referring to FIG. 3, in the EASCS for solar-powered wireless sensor networks according to the present embodiment, an amount of energy consumption of the battery and an amount of collected energy in each sensor node are profiled (S10). The profiled energy consumption of the battery and the amount of collected energy in each sensor node are used to calculate an amount of residual energy of the battery and a predetermined energy threshold window later.

When data transmission is required, the amount of residual energy of the battery in each of sensor nodes is calculated (S30).

One operation mode of a compression mode in which data is compressed and transmitted and a latency mode in which data is transmitted without compression according to the calculated amount of residual energy is selected.

Specifically, whether the calculated amount of residual energy is more than or equal to the predetermined energy threshold window is determined (S51), the latency mode is selected (S53) when the amount of residual energy is more than or equal to the predetermined energy threshold window, and the compression mode is selected (S55) when the amount of residual energy is less than the predetermined energy threshold window.

A node to which the EASCS described in the present disclosure is applied operates in the latency mode when the amount of residual energy is more than or equal to the predetermined energy threshold window and operates in the compression mode when the amount of residual energy is less than the predetermined energy threshold window as illustrated in FIG. 2.

In the latency mode, the data is transmitted without compression in order to reduce end-to-end latency even when energy consumption is large (S73). On the other hand, in the compression mode, the data is compressed using an S-LZW compression algorithm and then transmitted (S75), and thus the energy consumption is reduced and the end-to-end latency is increased.

Accordingly, the above-described two modes dynamically operate according to the amount of extra energy, and thus efficient results may be obtained in both terms of the energy and the latency. Further, since the extra energy is used, a blackout time does not increase.

Although the predetermined energy threshold window which determines the two operation modes may be preset, the EASCS for solar-powered wireless sensor networks according to one embodiment of the present disclosure may further include calculating a predetermined energy threshold window in the each of sensor nodes according to a charging rate of the battery.

The predetermined energy threshold window is related to a rate of energy consumption in the corresponding node, a rate of solar energy collection, and a remaining amount of the battery. The rate of solar energy collection is affected by a type of a solar panel, a location, weather, season, and the like, and the rate of energy consumption in the node is affected by a data sensing rate, a data transmission rate, and a duty cycle. However, these factors are not easy to make accurate predictions for.

In the present disclosure, a simple and efficient energy model that does not require the accurate prediction for each factor is used. When the average rate of energy collection in an $i^{th}$ node $n_i$ in solar-powered wireless sensor networks is denoted as $P_{solar}(i)$ and the average rate of energy consumption in the $i^{th}$ node $n_i$ is denoted as $P_{sys}(i)$, a value of $P_{sys}(i)$ may be obtained by profiling an amount of energy consumption while the node $n_i$ operates, and $P_{solar}(i)$ may be obtained based on a profile of an amount of collected energy (S10).

When a remaining amount of battery, which is currently available, in the node $n_i$ is denoted as $E_{residual}(i)$, a time $T_{full}$ expected until the battery is fully charged in the node $n_i$ may be expressed as the following Equation 1.

$$T_{full}(E_{residual}(i)) = \frac{C(i) - E_{residual}(i)}{P_{solar}(i) - P_{sys}(i)} \quad \text{[Equation 1]}$$

In Equation 1, C(i) denotes the full capacity of a battery in the $i^{th}$ node $n_i$. It is important that the battery is charged when $P_{solar}(i) > P_{sys}(i)$ is satisfied. In this case, since the value of $P_{solar}(i)$ is impossible to be adjusted but the value of $P_{sys}(i)$ is possible to be changed to a desired value by appropriately adjusting a duty cycle of the node $n_i$, $P_{solar}(i) > P_{sys}(i)$ may be satisfied by adjusting $P_{sys}(i)$.

Further, since an amount of charged solar energy is continuously changed according to weather, time, and the like, an accurate amount of collected energy is difficult to predict.

However, when an amount of energy remaining in the battery satisfies a condition of the following Equation 2, a blackout time from current time to a time at which the battery is fully charged will be zero.

$$E_{residual}(i) \geq P_{sys}(i) \cdot T_{full}(E_{residual}(i)) \quad \text{[Equation 2]}$$

That is, a system that satisfies Equation 2 operates until a time at which a next battery is fully charged without the blackout time even in the worst case.

$$E_{residual}(i) \geq \frac{P_{sys}(i)}{P_{solar}(i)} \cdot C(i)$$

may be derived through Equation 1 and Equation 2. It means that, when the battery has energy of at least $$\frac{P_{sys}(i)}{P_{solar}(i)} \cdot C(i),$$

the system normally operates even when any unforeseen circumstances such as weather changes, changes in energy consumption, or the like occur. In the present disclosure, the $$\frac{P_{sys}(i)}{P_{solar}(i)} \cdot C(i)$$

is defined as a predetermined energy threshold window, $E_{threshold}(i)$, and is denoted by the following Equation 3.

$$E_{threshold}(i) = \frac{P_{sys}(i)}{P_{solar}(i)} \cdot C(i) \quad \text{[Equation 3]}$$

When $E_{residual}(i) < E_{threshold}(i)$ is satisfied, it means that there is a possibility of a blackout time in the networks. Therefore, the node $n_i$ operates in the compression mode in order to save the energy. On the other hand, when $E_{residual}(i) \geq E_{threshold}(i)$ is satisfied, it means that there is extra energy other than the energy required for normal operations, and thus the node $n_i$ operates in the latency mode in order to use the extra energy to reduce the latency.

One important thing is that Equation 1 is established only when $P_{solar}(i) > P_{sys}(i)$ is satisfied. Therefore, Equation 3 derived from Equation 1 also means that the same condition, $P_{solar}(i) > P_{sys}(i)$, is satisfied. When $P_{solar}(i) < P_{sys}(i)$ is satisfied, a value of $E_{threshold}(i)$ is greater than the battery capacity C(i). Since the amount of the residual energy of the battery, $E_{residual}(i)$, may not be greater than C(i), the node always operates in the compression mode.

Then, when time continuously passes, the value of $P_{sys}(i)$ may be gradually reduced, $P_{solar}(i) > P_{sys}(i)$ may be satisfied, and thus the node $n_i$ may select one of the two operation modes through Equation 3 and the value of $E_{residual}(i)$. FIG. 2 is a view illustrating the relationship between the energy model and the operation modes of the system described in the present disclosure.

Figure 4:
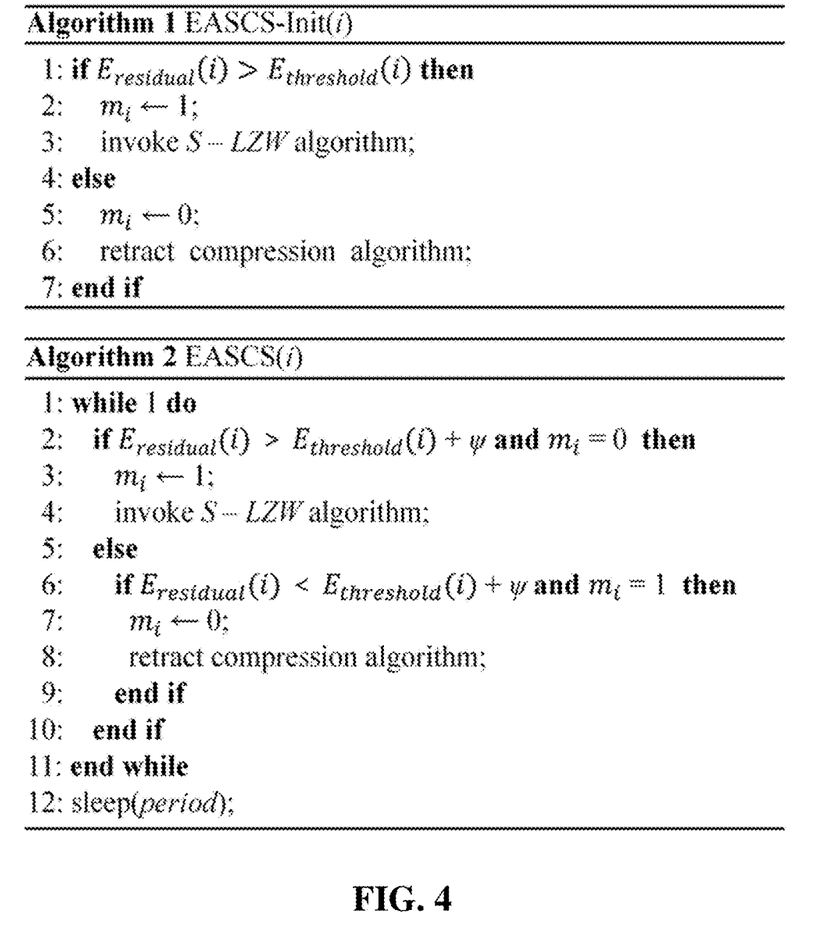
FIG. 4 is a view illustrating an algorithm of an energy-aware selective compression scheme according to one embodiment of the present disclosure as pseudo code.
Figure 5:
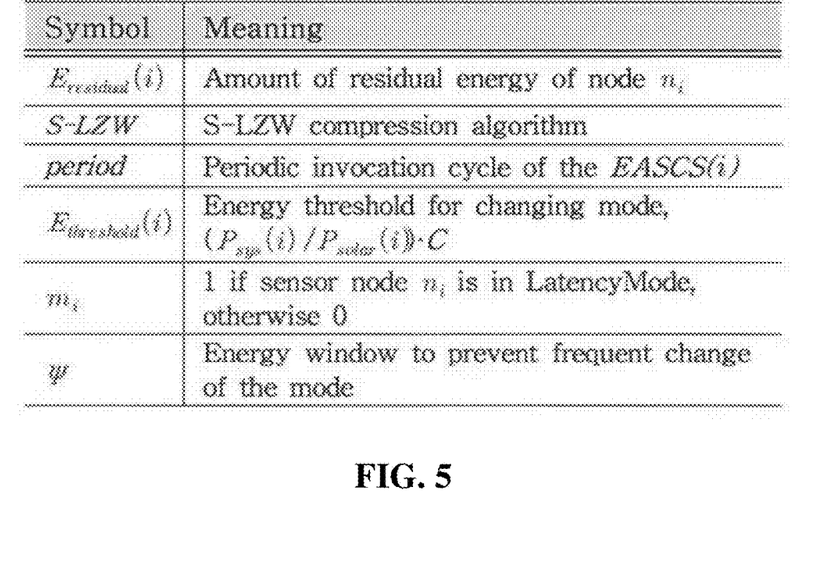
FIG. 5 is a view for describing symbols defined in the algorithm of FIG. 4.

FIG. 4 is a view illustrating the compression method described in the present disclosure as pseudo code through symbols defined in FIG. 5. In this pseudo code, a disposed node $n_i$ should execute EASCS-Init(i) to determine an initial operation mode. After the EASCS-Init(i) is executed, EASCS(i) is called. The EASCS(i) is periodically executed in the node $n_i$ as illustrated in Algorithm 2 of FIG. 4.

Meanwhile, when the mode of the node is changed, unnecessarily frequent changes may occur. For example, when it is assumed that there is a node $n_i$ which operates in a compression mode, it is assumed that a mode of the node $n_i$ is changed to a latency mode when $E_{residual}(i)$ barely exceeds $E_{threshold}(i)$. In this case, since the node $n_i$ does not have energy sufficient to stably operate, the $E_{residual}(i)$ is likely to be reduced quickly below a threshold again. Therefore, the $E_{residual}(i)$ of the node $n_i$ may be changed to the compression mode in a short time, and such a change is likely to occur repeatedly.

These frequent changes of the mode are likely to lead to the reduction of stability and performance of the system. Therefore, in the present disclosure, the mode may be prevented from being frequently changed through a transition window $\Psi$ of a predetermined energy threshold window as illustrated in FIG. 2. That is, the predetermined energy threshold window is an interval range having a minimum value and a maximum value rather than a predetermined value, and thus the current operation mode may be maintained without being changed when an amount of residual energy of the node $n_i$, is in the transition window of the predetermined energy threshold window.

Hereinafter, amounts of energy consumption and latencies of a compression method, a non-compression method, and the EASCS according to the present disclosure were measured by using a simulation in order to evaluate the performance of the compression method described in the present disclosure. The compression method is a method in which compression is performed on all of the nodes, and the non-compression method is a method in which the compression is not performed on all of the nodes.

Figure 6:
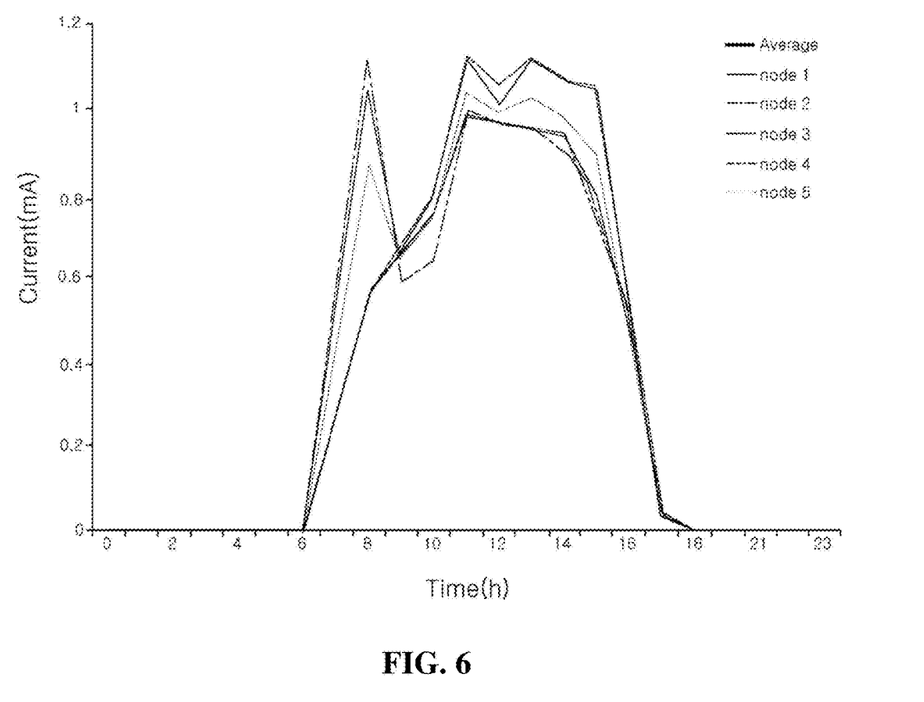
FIG. 6 is a graph illustrating amounts of collected energy in five nodes for each hour during a day.

Since the method described in the present disclosure is performed in the solar-powered wireless sensor networks, an amount of collected energy in each of the sensor nodes should be determined. To this end, an amount of collected energy measured for one month was used. FIG. 6 is a graph illustrating amounts of collected energy in five nodes for each hour during a day. As illustrated in FIG. 6, the collection is performed from sunrise to sunset, and an average amount of collected energy during a day is about 8.417 mAh.

Figure 7:
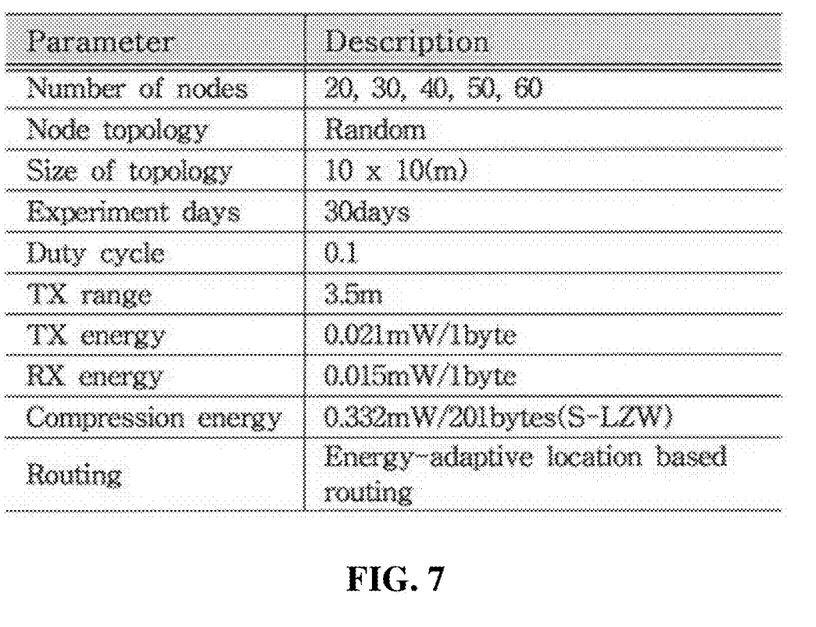
FIG. 7 is a table illustrating an experimental environment for evaluating the performance of a compression scheme described in the present disclosure.

A topology of the sensor network was configured as solar-powered sensor nodes, and a main experimental environment is illustrated in a table of FIG. 7.

Figure 8:
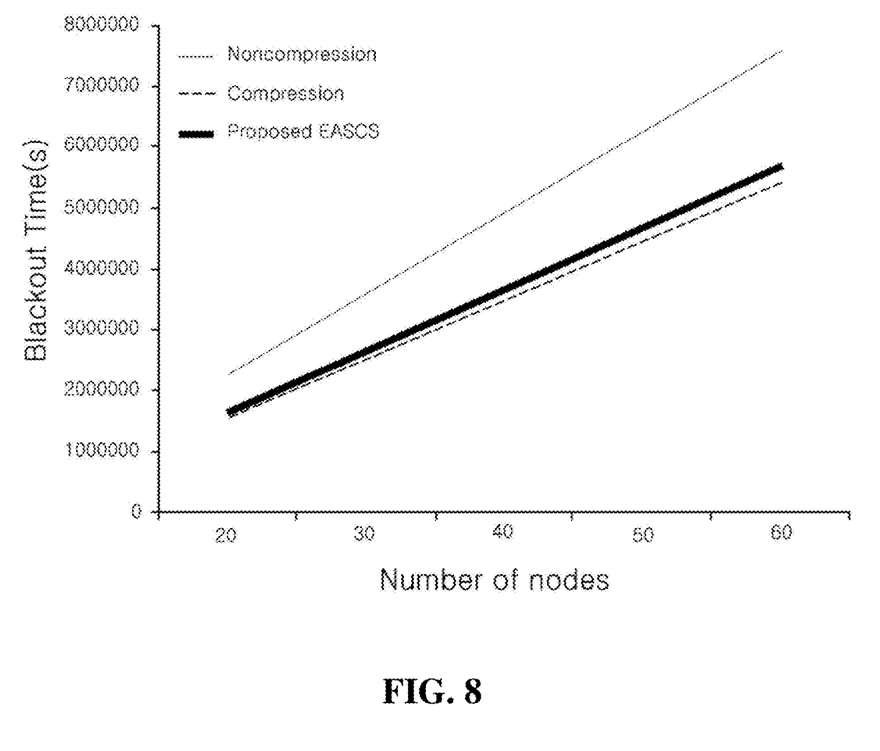
FIG. 8 is a graph illustrating blackout times according to the number of nodes in the present disclosure and a conventional technique.

An experiment for a blackout time was performed in consideration of periodically collected energy, data transmitting and receiving energy, and processing energy for compression, and blackout times of all of the nodes in the sensor networks were calculated. FIG. 8 is a graph illustrating a sum of blackout times according to numbers of nodes.

In experimental results, it can be seen that the blackout time in the non-compression method is longer than the blackout times of the compression method or the method described in the present disclosure. It can be confirmed that the method described in one embodiment of the present disclosure and the compression method have same or similar the blackout time. Since the EASCS according to the present disclosure, which is described in the present disclosure, uses the extra energy, it is proved that the blackout time has not been affected. Further, a similar result is also shown in each node, which illustrates the scalability of the EASCS according to the present disclosure.

Figure 9:
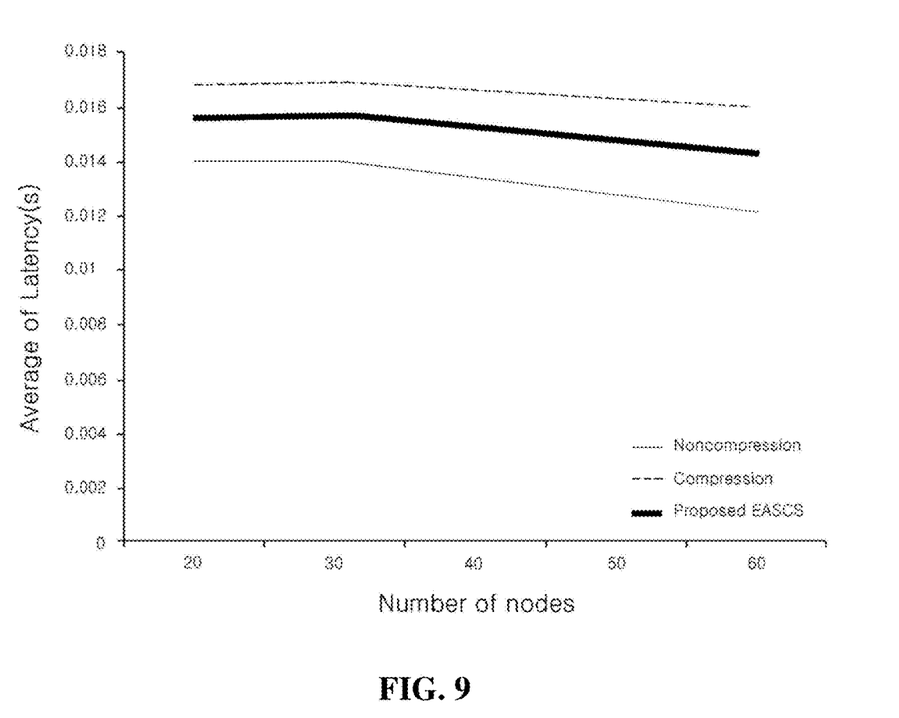
FIG. 9 is a graph illustrating average end-to-end latencies according to numbers of nodes in the present disclosure and a conventional technique.

FIG. 9 is a graph illustrating average end-to-end latencies according to numbers of nodes. The end-to-end latencies were tested in consideration of a data transmission rate according to an amount of data and a latency that occurs when compression is performed.

Referring to FIG. 9, it can be confirmed that the end-to-end latency in the compression scheme is greater than that in the non-compression method, and this is because of the latency that occurs in processing for the compression. By comparing the compression method and the EASCS according to the present disclosure, it can be confirmed that the end-to-end latency in the method described in the present disclosure is smaller than that in the compression method, and it can be seen that similar results are shown in each node density.

When the blackout time and the end-to-end latency are comprehensively analyzed, it can be seen that there is no different between the EASCS according to the present disclosure and the effective compression method in terms of the blackout time, which means the efficient utilization of energy. Further, it can be seen that the end-to-end latency in the EASCS according to the present disclosure is greater than that in the non-compression method and is smaller than that in the compression method. That is, performance of the end-to-end latency is improved without changing of the blackout time.

Since energy is periodically charged in solar-powered wireless sensor networks, it is aimed at energy use optimization rather than battery-powered energy use minimization. The EASCS according to the present disclosure selectively uses the compression mode and the latency mode for energy optimization according to an amount of energy of a battery.

The latency mode is a non-compression method in which energy consumption is increased but end-to-end latency is decreased, and compression mode is a compression method in which end-to-end latency is increased but energy consumption is decreased. Due to the selective use of the two modes, end-to-end latency may be reduced while the increase of the blackout time is minimized.

The above-described EASCS for solar-powered wireless sensor networks may be implemented as an application or as a form of computer instructions that can be performed through various computer components and may be recorded in computer readable recording media. The computer readable recording media may include program instructions, a data file, and a data structure, and/or combinations thereof.

The program instructions recorded in the computer readable recording media may be specially designed and prepared for the disclosure or may be available well-known instructions for those skilled in the field of computer software.

Examples of the computer readable recording media include, for example, magnetic media such as a hard disk, a floppy disk, and a magnetic tape, optical media such as a CD-ROM and a DVD, magneto-optical media such as a floptical disk, and a hardware device, such as a ROM, a RAM, or a flash memory, that is specially made to store and perform the program instruction.

Examples of the program instructions may include a machine code generated by a compiler and a high-level language code that can be executed in a computer using an interpreter. Such a hardware device may be configured as at least one software module in order to perform operations of the disclosure and vice versa.

According to the above-described EASCS for solar-powered wireless sensor networks, a compression mode and a latency mode are selectively used according to an amount of energy of a battery for energy optimization. The latency mode is a non-compression method in which energy consumption is increased due to data transmission without compression but end-to-end latency is decreased, and the compression mode is a compression method in which end-to-end latency is increased due to data transmission with compression but energy consumption is decreased.

Accordingly, a limitation such as constrained hardware resources (an amount of energy) in battery-powered sensor networks is compensated through two benefits of continuously chargeable solar energy and data compression, and thus end-to-end latency of the sensor networks can be reduced while a blackout time of the sensor networks is not increased. As a result, energy optimization in wireless sensor networks can be implemented.

While the present disclosure has been described above with reference to the embodiments, it may be understood by those skilled in the art that various modifications and alterations may be made without departing from the spirit and scope of the present disclosure described in the appended claims.

In sensor networks, compression has a trade-off between end-to-end latency and energy usage. When compression is performed to reduce a data size, additional latency and energy consumption occur and energy consumption due to transmission is reduced. Generally, in battery-powered sensor networks, compression is widely used to maximize lifetimes of the networks even when a latency is lost. Meanwhile, in solar-powered wireless sensor networks, energy is periodically reproduced, and thus the energy more than enough amount of energy for operating may be present.

In the present disclosure, an energy-aware selective compression method in which end-to-end latency is reduced by using extra energy is described, and thus compression is used to reduce the energy consumption when energy of a node is insufficient and the compression is not used to reduce the end-to-end latency when the energy of the node is sufficient. As the excellence of the described method is proved through simulation evaluation of energy and a latency by simulation, the described method may be usefully employed in solar-powered wireless sensor network fields.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

What is claimed is:

1. A method for an energy-aware selective compression scheme (EASCS) for solar-powered wireless sensor networks, the method comprising:
   calculating an amount of residual energy of a battery in each of sensor nodes in a wireless sensor network;
   selecting one operation mode between a compression mode and a latency mode in reply to the amount of the residual energy, wherein the compression mode is a mode that data is compressed and transmitted, and the latency mode is a mode that the data is transmitted without compression;
   compressing and transmitting the data if the compression mode in the each of the sensor nodes is selected, or transmitting the data without compression if the latency mode in the each of the sensor nodes is selected; and
   calculating a predetermined energy threshold window in the each of the sensor nodes according to a charging rate of the battery,
   wherein the predetermined energy threshold window in the each of the sensor nodes is calculated by values of an average rate of energy collection in an $i^{th}$ node $n_i$, an average rate of energy consumption in the $i^{th}$ node $n_i$ and a full capacity of a battery in the $i^{th}$ node $n_i$.

2. The method of claim 1, wherein a step of the selecting the one operation mode between the compression mode and the latency mode comprises:
   selecting the latency mode when the amount of the residual energy is more than or equal to a predetermined energy threshold value; and
   selecting the compression mode when the amount of the residual energy is less than the predetermined energy threshold window.

3. The method of claim 1, further comprising a step of maintaining one of the compression mode and the latency mode, which is previously selected when the amount of the residual energy is in a range of a predetermined energy threshold window.

4. The method of claim 1, wherein the predetermined energy threshold window in the each of the sensor nodes is calculated by the following equation, $$E_{Threshold}(i) = \frac{P_{sys}(i)}{P_{solar}(i)} \cdot C(i)$$

wherein $P_{solar}(i)$ denotes the average rate of energy collection in an $i^{th}$ node $n_i$, $P_{sys}(i)$ denotes the average rate of energy consumption in the $i^{th}$ node $n_i$, and $C(i)$ denotes the full capacity of a battery in the $i^{th}$ node $n_i$.

5. The method of claim 4, wherein the average rate of energy consumption in the $i^{th}$ node $n_i$ is obtained by profiling an amount of energy consumption, $P_{sys}(i)$ while the each of the sensor nodes operates, and the average rate of energy collection, $P_{solar}(i)$, is obtained by profiling an amount of collected energy.

6. A non-transitory computer-readable recording medium for performing a method for an energy-aware selective compression scheme (EASCS) for solar-powered wireless sensor networks, the method comprising:
   calculating an amount of residual energy of a battery in each of sensor nodes in a wireless sensor network;
   selecting one operation mode between a compression mode and a latency mode in reply to the amount of the residual energy, wherein the compression mode is a mode that data is compressed and transmitted, and the latency mode is a mode that the data is transmitted without compression;
   compressing and transmitting the data if the compression mode in the each of the sensor nodes is selected, or transmitting the data without compression if the latency mode in the each of the sensor nodes is selected; and
   calculating a predetermined energy threshold window in the each of the sensor nodes according to a charging rate of the battery, wherein the predetermined energy threshold window in the each of the sensor nodes is calculated by values of an average rate of energy collection in an $i^{th}$ node $n_i$, an average rate of energy consumption in the $i^{th}$ node $n_i$ and a full capacity of a battery in the $i^{th}$ node $n_i$.

7. The non-transitory computer-readable recording medium of claim 6, wherein a step of the selecting the one operation mode between the compression mode and the latency mode comprises:
selecting the latency mode when the amount of the residual energy is more than or equal to a predetermined energy threshold window; and
selecting the compression mode when the amount of the residual energy is less than the predetermined energy threshold window.

8. The non-transitory computer-readable recording medium of claim 6, further comprising a step of maintaining one of the compression mode and the latency mode, which is previously selected when the amount of the residual energy is in a range of a predetermined energy threshold window.

9. The non-transitory computer-readable recording medium of claim 6, wherein the predetermined energy threshold window in the each of the sensor nodes is calculated by the following equation, $$E_{Threshold}(i) = \frac{P_{sys}(i)}{P_{solar}(i)} \cdot C(i)$$

wherein $P_{solar}(i)$ denotes the average rate of energy collection in an $i^{th}$ node $n_i$, $P_{sys}(i)$ denotes the average rate of energy consumption in the $i^{th}$ node $n_i$, and $C(i)$ denotes the full capacity of a battery in the $i^{th}$ node $n_i$.

10. The non-transitory computer-readable recording medium of claim 9, wherein the average rate of energy consumption in the $i^{th}$ node $n_i$ is obtained by profiling an amount of energy consumption, $P_{sys}(i)$ while the each of the sensor nodes operates, and the average rate of energy collection, $P_{solar}(i)$, is obtained by profiling an amount of collected energy.

11. A device for an energy-aware selective compression scheme (EASCS) for solar-powered wireless sensor networks, the device comprising:
an energy calculating unit calculating an amount of residual energy of a battery in each of sensor nodes in a wireless sensor network;
a threshold calculating unit calculating a predetermined energy threshold window in the each of the sensor nodes according to a charging rate of the battery;
a mode selecting unit selecting one operation mode between a compression mode and a latency mode in reply to the amount of the residual energy, wherein the compression mode is a mode that data is compressed and transmitted, and the latency mode is a mode that the data is transmitted without compression; and
a transmitting unit compressing and transmitting the data if the compression mode in the each of the sensor nodes is selected, or transmitting the data without compression if the latency mode in the each of the sensor nodes is selected,
wherein the threshold calculating unit calculates a predetermined energy threshold window in the each of the sensor nodes according to a charging rate of the battery, and
wherein the predetermined energy threshold window in the each of the sensor nodes is calculated by values of an average rate of energy collection in a n $i^{th}$ node $n_i$, an average rate of energy consumption in the $i^{th}$ node $n_i$ and a full capacity of a battery in the $i^{th}$ node $n_i$.

12. The device of claim 11, wherein the mode selecting unit selects the latency mode when the amount of the residual energy is more than or equal to the predetermined energy threshold window, and the mode selecting unit selects the compression mode when the amount of the residual energy is less than the predetermined energy threshold window.

13. The device of claim 11, wherein the mode selecting unit maintains one of the compression mode and the latency mode, which is previously selected when the amount of the residual energy is in a range of a predetermined energy threshold window.

* * * * *